(12) United States Patent
Schlosser et al.

(10) Patent No.: US 9,591,281 B2
(45) Date of Patent: Mar. 7, 2017

(54) APPARATUS AND METHOD FOR DETERMINING A DISPARITY ESTIMATE

(75) Inventors: Markus Schlosser, Hannover (DE); Jorn Jachalsky, Wennigsen (DE); Ralf Ostermann, Hannover (DE)

(73) Assignee: THOMSON LICENSING, Issy les Moulineaux (FR)

( * ) Notice: Subject to any disclaimer, the term of this patent is extended or adjusted under 35 U.S.C. 154(b) by 259 days.

(21) Appl. No.: 13/995,602

(22) PCT Filed: Jun. 30, 2011

(86) PCT No.: PCT/EP2011/061018
§ 371 (c)(1),
(2), (4) Date: Jun. 19, 2013

(87) PCT Pub. No.: WO2012/084277
PCT Pub. Date: Jun. 28, 2012

(65) Prior Publication Data
US 2013/0272582 A1    Oct. 17, 2013

(30) Foreign Application Priority Data
Dec. 22, 2010   (EP) .................................... 10306488

(51) Int. Cl.
*G06T 7/00* (2006.01)
*G06K 7/00* (2006.01)
(Continued)

(52) U.S. Cl.
CPC ....... *H04N 13/0022* (2013.01); *G06K 9/4642* (2013.01); *G06T 7/0075* (2013.01);
(Continued)

(58) Field of Classification Search
CPC ........ G06T 7/0075; G06T 2207/10012; G06K 9/4642
See application file for complete search history.

(56) References Cited

U.S. PATENT DOCUMENTS

| | | | |
|---|---|---|---|
| 5,867,591 A * | 2/1999 | Onda | ............................ 382/154 |
| 5,937,079 A * | 8/1999 | Franke | .................. G06K 9/209 |
| | | | 348/E13.014 |

(Continued)

FOREIGN PATENT DOCUMENTS

| | | |
|---|---|---|
| CN | 101605270 | 12/2009 |
| WO | WO0027131 | 5/2000 |

OTHER PUBLICATIONS

Jachalsky et al., "Confidence evaluation for robust, fast-converging disparity map refinement", IEEE International Conference on Multimedia and Expo (ICME), Singapore, Jul. 19, 2010, pp. 1399-1404.

(Continued)

*Primary Examiner* — Utpal Shah
(74) *Attorney, Agent, or Firm* — Tutunjian & Bitetto, P.C.

(57) ABSTRACT

The invention relates to a method and an apparatus for determining a disparity value for an object located in or to be placed into a stereoscopic image pair having an associated disparity map. First an area to be analyzed in one of the stereoscopic images is determined Then a histogram is built from disparity estimates of the associated disparity map that fall within the determined area. Subsequently a contiguous range of bins is searched in the histogram that also contains a sufficient number of pixels. Finally, a disparity estimate for the determined area is selected from the contiguous range of histogram bins.

22 Claims, 1 Drawing Sheet

(51) Int. Cl.
*H04N 13/00* (2006.01)
*G06K 9/46* (2006.01)

(52) U.S. Cl.
CPC ......... *H04N 13/004* (2013.01); *H04N 13/007* (2013.01); *G06T 2207/10021* (2013.01)

(56) References Cited

U.S. PATENT DOCUMENTS

| | | | |
|---|---|---|---|
| 6,226,396 B1* | 5/2001 | Marugame | 382/154 |
| RE37,610 E | 3/2002 | Tsuchiya et al. | |
| 8,116,557 B2* | 2/2012 | Ha et al. | 382/154 |
| 8,174,563 B2* | 5/2012 | Saito | 348/47 |
| 8,644,593 B2* | 2/2014 | Woo | 382/154 |
| 2005/0093697 A1* | 5/2005 | Nichani | G06K 9/00778 340/545.1 |
| 2008/0037845 A1* | 2/2008 | Deuerling-Zheng et al. | 382/130 |
| 2010/0079579 A1 | 4/2010 | Kikuchi | |
| 2011/0158528 A1* | 6/2011 | Yea et al. | 382/170 |
| 2011/0267440 A1* | 11/2011 | Kim | G06T 7/0022 348/55 |
| 2011/0292178 A1* | 12/2011 | Goma et al. | 348/46 |
| 2012/0076361 A1* | 3/2012 | Fujiyoshi | G06T 7/004 382/103 |
| 2012/0133639 A1* | 5/2012 | Kopf et al. | 345/419 |
| 2012/0140038 A1* | 6/2012 | Bi | H04N 13/0022 348/46 |
| 2012/0321172 A1* | 12/2012 | Jachalsky et al. | 382/154 |

OTHER PUBLICATIONS

Chauvier et al., "Does size matter? The impact of screen size on stereoscopic 3DTV", IBC 2010 Conference Paper, Amsterdam, Jul. 15, 2010, pp. 1-14.

Ogale et al., "Shape and the Stereo Correspondence Problem", International Journal of Computer Vision, vol. 65, Issue 3, Dec. 2005, pp. 1-17.

Sun et al., "Symmetric Stereo Matching for Occlusion Handling", Computer Vision and Pattern Recognition, 2005. CVPR 2005, Jun. 20, 2005, vol. 2, pp. 399-406.

Yoon et al., "Joint Estimation of Shape and Reflectance using Multiple Images with Known Illumination Conditions", International Journal of Computer Vision, vol. 86, No. 2, Jan. 2010, pp. 192-210.

Blonde et al., "3D Stereo Rendering Challenges and Techniques", 44th Conference on Information Sciences and Systems (CISS), Princeton, NJ, USA, Mar. 17, 2010, pp. 1-6.

Steffens et al., "Probabilistic Scene Analysis for Robust Stereo Correspondence", 6th International Conference, ICIAR 2009, Halifax, Canada, Jul. 6, 2009, pp. 697-796.

* cited by examiner

APPARATUS AND METHOD FOR DETERMINING A DISPARITY ESTIMATE

This application claims the benefit, under 35 U.S.C. §365 of International Application PCT/EP2011/061018, filed Jun. 30, 2011, which was published in accordance with PCT Article 21(2) on Jun. 28, 2012 in English and which claims the benefit of European patent application No. 10306488.7, filed Dec. 22, 2010.

FIELD OF THE INVENTION

The invention relates to a method and an apparatus for determining a disparity value for an object located in or to be placed into a stereoscopic image pair, and more specifically a stereoscopic image pair having an associated disparity map.

BACKGROUND

In 3D-TV, 3D-video and 3D-cinema, the insertion of graphics elements needs to follow some rules concerning their depth positioning in order to avoid visual discomfort. Most importantly, a superimposed element should not be stereoscopically positioned behind an object in the video, as this would violate real world physical constraints. However, graphics elements may also not keep a too large safety margin in front of the closest object as a too strong "pop-out effect" may also lead to visual fatigue, caused by the accommodation-vergence conflict. Especially subtitles should be placed just in front of the closest object, as reading them is equivalent to a frequent refocusing between the video and the text. A human observer needs significantly more time to switch his or her focus of attention if the associated jump in depth is larger.

As a consequence, the stereoscopic positioning of text and graphics for 3D menus or 3D subtitles requires few, but highly reliable and accurate depth estimates to avoid these elements to be placed too far in front of the screen or, even worse, behind a video object. To compute depth information from a set of two (or more) images, stereo matching is applied to find point correspondences between the input images. The displacement between two corresponding points is referred to as disparity. The 3D structure of a scene can be reconstructed from these disparities through triangulation if the camera parameters are known.

Using calibration and rectification, it can be approximated reasonably well as if the images were captured with perfectly aligned, ideal pinhole cameras, which do not show any lens distortions. Although this allows the search to be restricted to horizontal lines, stereo matching still remains an ill-defined estimation problem for several reasons, like occlusions, perspective deformations, specular reflections, depth discontinuities, as well as missing or quasi-periodic texture.

For the above reasons the performance of the stereo matching process inherently depends on the underlying image content. For some parts of an image it is inherently more difficult to determine accurate values for the disparity. This leads to varying levels of accuracy and reliability for the disparity estimates.

For this reason, in addition to the actual disparity value itself the reliability of a disparity estimate represents valuable information. A confidence map reflecting the estimated reliability is preferably provided along with the disparity map, wherein a confidence value is determined for every disparity value.

SUMMARY

It is an object of the invention to provide a solution for determining a highly reliable and accurate disparity value for an object located in or to be placed into a stereoscopic image pair.

According to one aspect of the invention, this object is achieved by a method for determining a disparity value for an object located in or to be placed into a stereoscopic image pair, the stereoscopic image pair having an associated disparity map, which comprises the steps of:
 determining an area to be analyzed in one of the stereoscopic images;
 building a histogram from disparity estimates of the associated disparity map that fall within the determined area;
 searching a contiguous range of bins in the histogram that also contains a sufficient number of pixels; and
 selecting a disparity estimate for the determined area from the contiguous range of histogram bins.

According to a further aspect of the invention, an apparatus for determining a disparity value for an object located in or to be placed into a stereoscopic image pair, the stereoscopic image pair having an associated disparity map, is adapted to perform a method according to the invention. For this purpose the apparatus comprises a graphics analyzing block for determining the area that is to be analyzed. A histogram building block is provided for building a histogram from all disparity estimates that fall within the area determined by the graphics analyzing block. A searching block is provided for searching for the closest or farthest contiguous range of bins in the histogram is searched that also contains a sufficient number of pixels in total. Finally, a selecting block is provided for selecting a robust estimate of the minimum disparity. Of course, one or more of the different processing blocks may likewise be combined into a single multi-purpose processing block.

If an application requires only few, but highly reliable and accurate depth/disparity estimates, the described invention robustly removes false estimates, which are inherent in stereo matching. A cluster of similar estimates in the depth/disparity map needs to be sufficiently large to be considered a robust detection of an object or even part of an object, which can be checked by histogram analysis.

Advantageously, only those disparity estimates falling within the determined area are used to build the histogram for which an associated confidence measure exceeds a defined threshold. Alternatively, instead of accumulating the number of disparity estimates exceeding a defined threshold, the histogram is built by accumulating the confidence values of the disparity estimates, or a value derived from the confidence values of the disparity estimates. The confidence measure is favorably derived from the similarity function employed during stereo matching or from information about at a match quality between a pixel or a group of pixels in the first stereo image and a corresponding pixel or a corresponding group of pixels in the second stereo image. Alternatively, a more elaborate confidence measure is used, as described, for example, in J. Jachalsky et al.: "Confidence evaluation for robust, fast-converging disparity map refinement", IEEE International Conference on Multimedia and Expo (ICME), 2010, pp. 1399-1404.

Based on this additional confidence evaluation, a cluster of similar estimates in the depth/disparity map needs to pass the confidence evaluation in addition to being sufficiently large to be considered a robust detection of an object or even part of an object. As these two strategies are independent of each other, by combining the two strategies false estimates are detected and removed even more robustly than with each one of these strategies alone.

In order to determine the full (reliable) disparity range of the stereoscopic images, favorably the area to be analyzed in one of the stereoscopic images is the complete stereoscopic image. For this purpose the contiguous range farthest from and closest to a viewer are searched in the histogram. The determined disparity estimates may then be used to adapt the stereoscopic image pair to a display. For example, the determined disparity range may be compared with some predefined limits to verify that the content will not cause visual fatigue. Additionally, it may also be used to guide synthesizing appropriate new views in order to respect these limits. This maximizes the 3D effect while minimizing visual discomfort. Examples for an adaptation of the stereoscopic image pair to a display are found, for example, in L. Chauvier et al.: "Does size matter? The impact of screen size on stereoscopic 3DTV", IBC 2010 Conference Paper.

Advantageously, the area to be analyzed in one of the stereoscopic images is determined by the area of a graphics object to be placed into the stereoscopic image pair, e.g. a menu item or a subtitle. As the stereoscopic positioning of text and graphics for 3D menus or 3D subtitles requires highly reliable and accurate depth/disparity estimates, the invention is well suited for such applications. In order to avoid these elements to be placed too far in front of the screen or behind a video object, the contiguous range closest to a viewer within the area of the graphics object is searched in the histogram.

Favorably, the disparity estimate for the determined area is selected as the disparity for which the collected number of pixels surpasses the threshold or a fraction of the threshold, as a function of the absolute minimum, mean or maximum of the found contiguous range, or as a function of the maximum or median of a sub-histogram for this contiguous range. All these approaches allow to determine the disparity value with a reasonable computational effort.

Advantageously, the determined area to be analyzed is subdivided into smaller areas. This allows to ensure at least a certain spatial proximity of the pixels associated with the found disparity interval.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
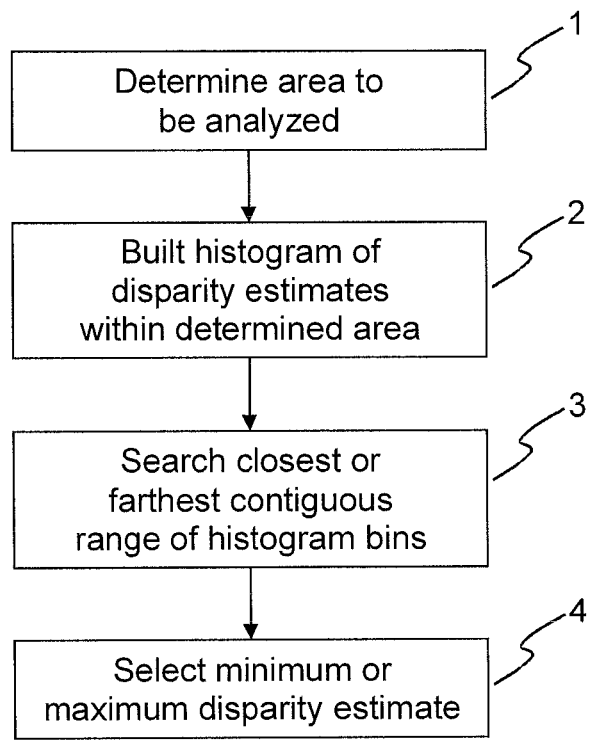
FIG. 1 shows a flowchart of a method according to the invention.

In FIG. 1 a simplified flowchart of a method according to the invention is depicted. In a first step 1 the area that is to be analyzed is determined. This may be the complete stereoscopic image or the area covered by a graphics element to be placed into the stereoscopic image or an area determined by some other means. For simplicity a bounding box of the graphics element may be used during this step instead of an accurate 2D projection of the graphics element. In a second step 2 a histogram is built from all disparity estimates that fall within the area determined in the first step and whose assigned confidence measure is above a defined threshold $CM_{min}$. Alternatively, instead of accumulating the number of disparity estimates exceeding a defined threshold $CM_{min}$, the histogram can be built by accumulating the confidence values of the disparity estimates, or a value derived from the confidence values of the disparity estimates. As disparities are typically estimated with integer or fractional accuracy, the histogram may easily be built by allocating each potential disparity value its specific bin in the histogram. In a third step 3 the closest (to the viewer) contiguous range of histogram bins is searched that also contains a sufficient number $N_{min}$ of pixels in total. Advantageously, the number of disparity values in the contiguous range of bins also has surpassed a minimum threshold in one histogram bin $N_{min\_bin}$. A new range starts whenever the number of disparity values drops below a defined threshold $d_{min}$ for a certain disparity interval $\Delta_d$. Finally, in a fourth step 4 a robust estimate of the minimum disparity is obtained. The estimate of the minimum disparity may be obtained in several ways, for example as a function of the disparity for which the collected number of pixels surpasses the threshold $N_{min}$ or a fraction of the threshold $N_{min}$, as a function of the absolute minimum, mean or maximum of the found disparity interval, or as a function of the maximum or median of the sub-histogram for this disparity interval.

Apparently the above procedure may not only be used to robustly determine the closest object in the scene, but also the farthest one. In this case the farthest (to the viewer) contiguous range of histogram bins is searched that also contains a sufficient number $N_{min}$ of pixels in total. In addition, in the fourth step 4 a robust estimate of the maximum disparity is obtained.

Alternatively, it is likewise possible to determine disparity values for specified objects within the stereoscopic image. For this purpose for each object a histogram is built for those pixels that belong to the object. In this case contiguous ranges are searched in the histograms associated to the objects. Several approaches for object segmentation are known from prior art. Either fully automatic or semi-automatic segmentation approaches can be used. The segmentation does not need to be perfect, due to the inherent robustness of the proposed histogram analysis.

Due to the combination of the confidence evaluation with the histogram analysis, adjusting the parameters is uncritical. In an actual implementation, the parameter values $CM_{min}=0.5$, $N_{min}=20$, $d_{min}=0$, and $Delta_d=1$ pixel lead to good results.

Figure 2:
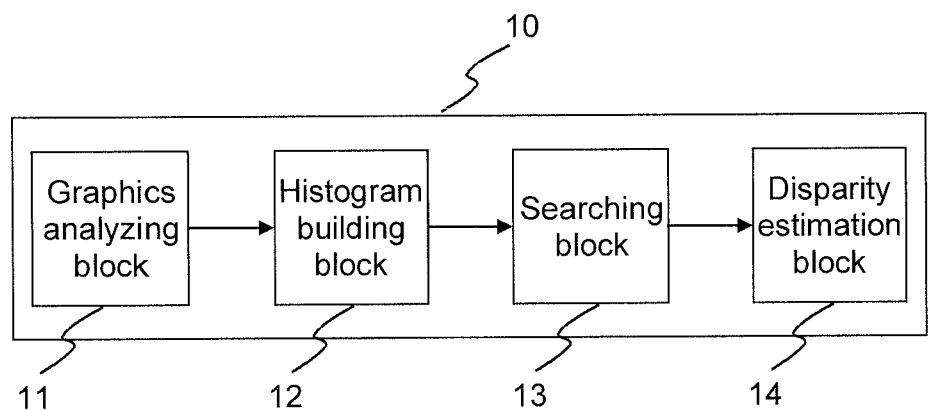
FIG. 2 depicts an apparatus adapted to perform the method according to the invention.

In FIG. 2 an apparatus 10 adapted to perform the method of FIG. 1 is shown schematically. The apparatus 10 comprises a graphics analyzing block 11 for determining the area that is to be analyzed. A histogram building block 12 builds a histogram from all disparity estimates that fall within the area determined by the graphics analyzing block 11. A searching block 13 is provided for searching for the closest or farthest contiguous range in the histogram is searched that also contains a sufficient number $N_{min}$ of pixels in total. Finally, a disparity estimation block 14 is provided for selecting a robust estimate of the minimum disparity. Of course, one or more of the different processing blocks 11, 12, 13, 14 may likewise be combined into a single multi-purpose processing block.

In the above description, contiguousness is defined in terms of disparity and not real-world coordinates, so that dispersed outliers of similar depth could happen to pass the test. To ensure at least a certain spatial proximity of the pixels associated with the found disparity interval, the examined area may also be subdivided into smaller ranges.

The invention claimed is:

1. A method for determining a disparity value for an object located in or to be placed into a stereoscopic image pair, the stereoscopic image pair having an associated disparity map having disparity estimates for individual pixels of the stereoscopic image pair, the method comprising:
   determining an area to be analyzed in one of the stereoscopic images;
   retrieving those disparity estimates from the associated disparity map that are associated with pixels of the stereoscopic image pair that lie within the determined area;
   building a histogram from the retrieved disparity estimates;
   searching a contiguous range of histogram bins, each histogram bin of the contiguous range containing at least a specified minimum number of disparity estimates and the contiguous range containing in total at least a specified number of disparity estimates; and
   selecting a disparity estimate for the determined area from the contiguous range of histogram bins.

2. The method according to claim 1, wherein only those disparity estimates from the associated disparity map that are associated with pixels of the stereoscopic image pair that lie within the determined area are used to build the histogram for which an associated confidence measure exceeds a defined threshold.

3. The method according to claim 1, wherein said building a histogram further comprises accumulating associated confidence measures of the disparity estimates, or a value derived from the associated confidence measures of the disparity estimates.

4. The method according to claim 1, wherein the determined disparity estimate is used to adapt the stereoscopic image pair to a display.

5. The method according to claim 1, wherein the area to be analyzed in one of the stereoscopic images is the complete stereoscopic image.

6. The method according to claim 1, wherein the contiguous range farthest from a viewer is searched in the histogram.

7. The method according to claim 1, wherein the contiguous range closest to a viewer is searched in the histogram.

8. The method according to claim 7, wherein the area to be analyzed in one of the stereoscopic images is determined by the area of one or more graphics objects to be placed into the stereoscopic image pair.

9. The method according to claim 8, wherein the graphics object is a menu item, a score board, a logo or a subtitle.

10. The method according to claim 1, wherein the disparity estimate for the determined area is selected as the disparity for which the collected number of pixels surpasses the threshold or a fraction of the threshold, as a function of the absolute minimum, mean or maximum of the found contiguous range, or as a function of the maximum or median of a sub-historgram for this contiguous range.

11. The method according to claim 1, further comprising subdividing the determined area to be analyzed.

12. An apparatus for determining a disparity value for an object located in or to be placed into a stereoscopic image pair, the stereoscopic image pair having an associated disparity map having disparity estimates for individual pixels of the stereoscopic image pair, wherein the apparatus comprises:
   a graphics analyzing block configured to determine an area to be analyzed in one of the stereoscopic images;
   a histogram building block configured to retrieve those disparity estimates from the associated disparity map that are associated with pixels of the stereoscopic image pair that lie within the determined area and to build a histogram from the retrieved disparity estimates;
   a searching block configured to search a contiguous range of histogram bins, each histogram bin of the contiguous range containing at least a specified number of disparity estimates and the contiguous range containing in total at least a specified number of disparity estimates; and
   a disparity estimation block configured to select a disparity estimate for the determined area from the contiguous range of histogram bins.

13. The apparatus according to claim 12, wherein the histogram building block is configured to use only those disparity estimates from the associated disparity map that are associated with pixels of the stereoscopic image pair that lie within the determined area to build the histogram for which an associated confidence measure exceeds a defined threshold.

14. The apparatus according to claim 12, wherein the histogram building block is configured to build the histogram by accumulating associated confidence measures of the disparity estimates, or a value derived from the associated confidence measures of the disparity estimates.

15. The apparatus according to claim 12, wherein the apparatus is configured to use the determined disparity estimate to adapt the stereoscopic image pair to a display.

16. The apparatus according to claim 12, wherein the area to be analyzed in one of the stereoscopic images is the complete stereoscopic image.

17. The apparatus according to claim 12, wherein the searching block is configured to search the contiguous range farthest from a viewer in the histogram.

18. The apparatus according to claim 12, wherein the searching block is configured to search the contiguous range closest to a viewer in the histogram.

19. The apparatus according to claim 18, wherein the area to be analyzed in one of the stereoscopic images is determined by the area of one or more graphics objects to be placed into the stereoscopic image pair.

20. The apparatus according to claim 19, wherein the graphics object is a menu item, a score board, a logo or a subtitle.

21. The apparatus according to claim 12, wherein the disparity estimation block is configured to select the disparity estimate for the determined area as the disparity for which the collected number of pixels surpasses the threshold or a fraction of the threshold, as a function of the absolute minimum, mean or maximum of the found contiguous range, or as a function of the maximum or median of a sub-histogram for this contiguous range.

22. The apparatus according to claim 12, wherein the graphics analyzing block is configured to subdivide the determined area to be analyzed.

* * * * *